(12) United States Patent
Schrank

(10) Patent No.: US 6,407,803 B1
(45) Date of Patent: Jun. 18, 2002

(54) LASER MEASURING DEVICE

(75) Inventor: Willi Schrank, Schopfheim (DE)

(73) Assignee: Endress + Hauser GbmH + Co., Maulburg (DE)

( * ) Notice: Subject to any disclaimer, the term of this patent is extended or adjusted under 35 U.S.C. 154(b) by 0 days.

(21) Appl. No.: 09/499,860

(22) Filed: Feb. 7, 2000

Related U.S. Application Data

(60) Provisional application No. 60/158,734, filed on Oct. 11, 1999.

(30) Foreign Application Priority Data

Mar. 25, 1999 (EP) .............................. 99106020

(51) Int. Cl.$^7$ .............................. G01C 3/08; G01F 23/00
(52) U.S. Cl. ......................... 356/4.01; 356/5.01; 73/293
(58) Field of Search ................ 356/5.01–5.15, 356/28.5, 4.01, 3.01–3.16

(56) References Cited

U.S. PATENT DOCUMENTS

| 4,722,599 | A | * | 2/1988 | Fruengel et al. |
| 4,749,273 | A | | 6/1988 | Reinhold |
| 5,194,747 | A | | 3/1993 | Culpepper et al. |
| 5,233,415 | A | * | 8/1993 | French et al. |

FOREIGN PATENT DOCUMENTS

| FR | 1432792 | 12/1965 |
| WO | WO 89/02069 | 3/1989 |
| WO | WO 95/10030 | 4/1995 |

* cited by examiner

Primary Examiner—Stephen C. Buczinski
(74) Attorney, Agent, or Firm—Bose McKinney & Evans LLP

(57) ABSTRACT

A laser measuring device is to be provided which should be substantially maintenance-free. In front of a window for the passage of laser beams (2) that contains a protective pane or lens, a compressed-air chamber (3) is provided. The latter has a compressed-air connection (4) that is connected by a compressed-air line (5) containing a control element (10) to a source of compressed air, and to which compressed air is supplied in operation. On the side of the compressed-air chamber (3) remote from the window, there is provided an air lock (6) which is only open during a measurement. In the open condition (6) of the air lock, a light channel (7) is open to permit the passage of the laser beams (2) and of light beams reflected from an object (8). In the closed condition (6') of the air lock, the light channel (7) is closed. In this way, dirt deposits on the lens or protective pane in the window are avoided as far as possible, and cleaning, particularly prior to each measurement, is unnecessary.

16 Claims, 1 Drawing Sheet

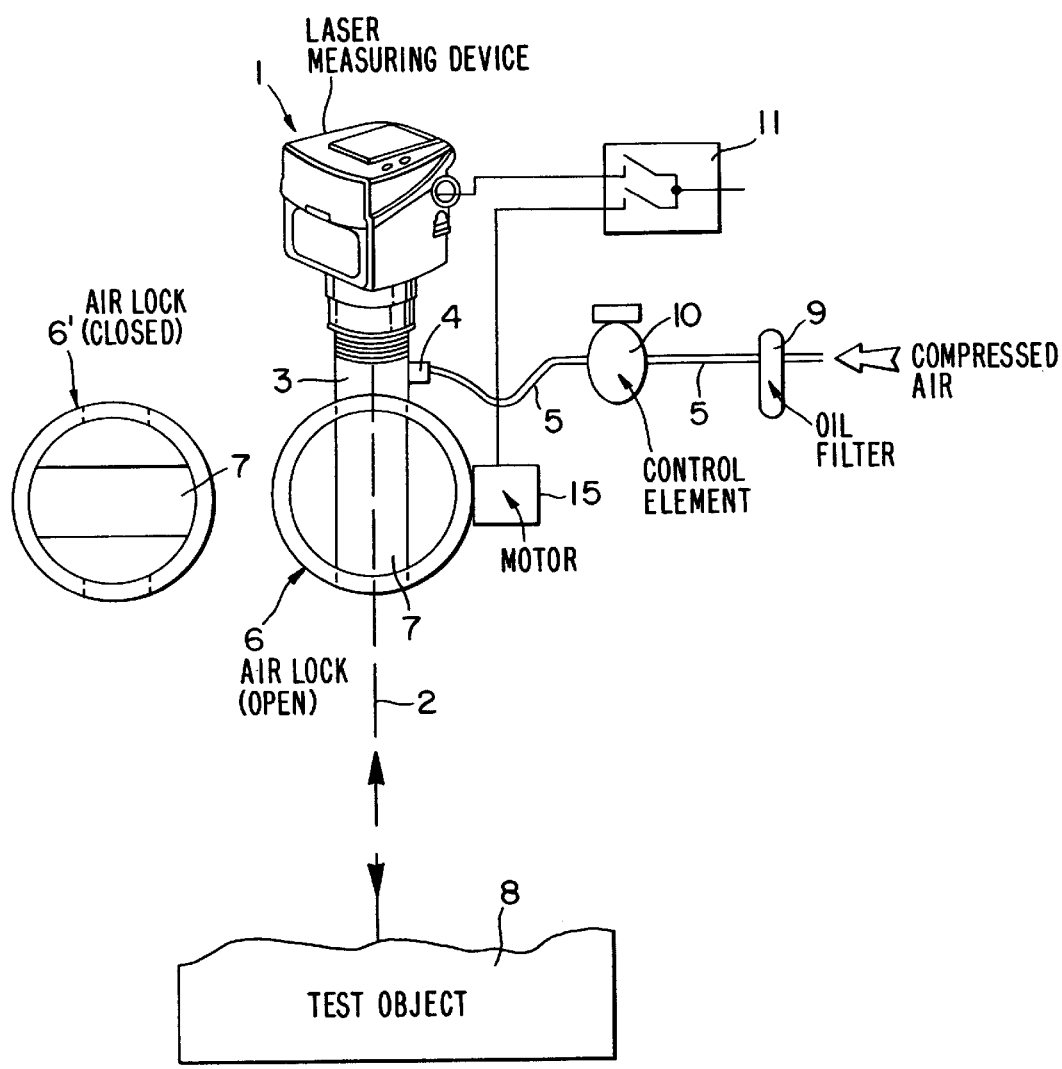

LASER MEASURING DEVICE

This application claims benefit to Provisional Application No. 60/158,734 filed Oct. 11, 1999.

FIELD OF THE INVENTION

This invention relates to a laser measuring device.

BACKGROUND OF THE INVENTION

Measuring devices using laser beams are in common use. They are employed for various measurement purposes, e.g., to measure tank-contents level, to measure the distance between objects, and to scan surface structures, and are based on the principle of transit-time measurement. Laser pulses from a laser source are directed to an object, and light beams reflected from this object are received by evaluation electronics. The time required for a pulse to travel from the laser source to the object plus the travel time of the light beams reflected from the object to a detector is generally the measured quantity to be evaluated.

If the laser source and the detector are located at the same distance from the object, this distance is $$d = tc/2$$

where t is the measured round-trip time, and c is the velocity of light.

By directing the laser beams to the surface of material in a tank, for example, and detecting the reflected light beams, changes in the level of the material can be detected and monitored.

The laser source sends the laser pulses through a protective pane or a lens in the housing of the laser measuring device, and the detector, which is preferably integrated with the laser source in the housing, receives the reflected light pulses through this protective pane or lens.

A problem associated with such laser measuring devices is the necessary continuous maintenance of the device, particularly if it is used in a dusty or otherwise contaminative environment. The protective pane or lens must then be cleaned prior to each measurement, so that the device can operate correctly and provide reliable data.

WO-A 95/10030 discloses a laser level measuring device whose housing has a lateral opening through which the protective pane or lens has to be regularly cleaned by hand, namely with a cleaning cloth.

It is an object of the invention to provide a substantially maintenance-free laser measuring device wherein dirt deposits on the lens or protective pane in the exit and entry window of the device are avoided as far as possible, so that cleaning, particularly prior to each measurement, is unnecessary.

SUMMARY OF THE INVENTION

To attain this object, the invention provides a laser measuring device wherein in front of a window for the passage of laser beams
which contains a protective pane or lens,
a compressed-air chamber is provided
which has a compressed-air connection that is connected by a compressed-air line to a source of compressed air, and
to which compressed air is supplied in operation, and on whose side remote from the window there is provided an air lock in whose open condition a light channel is open to permit the passage of the laser beams and of light beams reflected from an object,
in whose closed condition the light channel is closed, and
which is open only during a measurement.

The basic idea of the invention is to clean the protective pane or the lens of the measuring device with a jet of compressed air. A jet of compressed air permanently sweeping over the protective pane or lens, however, would entail considerable expense, inter alia because a compressor providing the compressed air would have to be in continuous operation. Therefore, a compressed-air chamber that is supplied with the compressed air via a compressed-air connection and a compressed-air line containing a control element is provided in front of the window for the laser and light beams.

In a first preferred embodiment of the invention, the compressed-air line contains a control element that blocks the passage of compressed air when the air lock is open.

In a second preferred embodiment of the invention, the control element permits the passage of compressed air when the air lock is open.

According to a first improvement of the invention and of the embodiments just mentioned, the control element sets or limits the pressure in the compressed-air chamber to a maximum of 200 kPa (=2 bars).

In a third preferred embodiment of the invention, the air lock is operated by means of a motor and the operation is synchronized with the beginning of a measurement.

According to a improvement of the third preferred embodiment of the invention, the motor is electrically or pneumatically driven.

In a fourth preferred embodiment of the invention, an oil filter is provided in the compressed-air line between the compressed-air chamber and the source of compressed air.

One advantage of the invention is that the overpressure created in the compressed-air chamber when the air lock is closed prevents dust or dirt particles from entering the compressed-air chamber and depositing on the protective pane or lens in the window. When the air lock is briefly opened for a measurement, air will escape from the compressed-air chamber and thus prevent dust or dirt particles from reaching the compressed-air chamber or the protective pane or lens during a measuring operation. This advantage also accrues in the second preferred embodiment of the invention.

The laser measuring device is thus substantially maintenance-free since cleaning of the window at regular, short time intervals as is required in the above-mentioned prior art is not necessary.

Since the air lock is opened only for the duration of a measurement, and the pressure in the compressed-air chamber in the closed condition of the air lock can be limited to a reasonable value, the overall consumption of compressed air is very low. The compressed air can be provided by a small pump during intervals between measurements. Costly compressed-air lines are not necessary.

BRIEF DESCRIPTION OF THE DRAWINGS

FIG. 1 illustrates an exemplary embodiment of a laser measuring device which incorporates various features of the present invention therein.

DETAILED DESCRIPTION OF EXEMPLARY EMBODIMENTS

While the invention is susceptible to various modifications and alternative forms, exemplary embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

The invention will now be explained in more detail with reference to the single figure of the accompanying drawing, in which one embodiment of a laser measuring device is illustrated in a schematic diagram.

A laser measuring device 1 has a window (not visible in the drawing) for the passage of laser beams which contains a lens or a protective pane. In front of the window is a compressed-air chamber 3, which during operation is supplied with compressed air via a compressed-air connection 4 and a compressed-air line 5; this is indicated by an arrow.

On its side remote from the measuring device 1, the compressed-air chamber 3 is opened or closed by an air lock 6, 6'. The open condition is denoted in the figure by 6, and the closed condition by 6'.

When the air lock 6 is open, the light channel 7 is open for the laser and light beams 2, i.e., the laser beams 2 can fall on a test object 8 and the light beams reflected from the test object 8 can enter the measuring device 1. When the air lock 6' is closed, the light channel 7 is closed. The opening and closing of the air lock 6, 6' is done by means of a motor 15, which may be driven electrically or pneumatically.

Between the compressed-air source and the compressed-air connection 4, the compressed-air line 5 preferably contains an oil filter 9, which ensures that the compressed-air chamber 3 is supplied exclusively with oil-free compressed air.

The compressed-air line 5 preferably incorporates a control element 10, which blocks the supply of compressed air when the air lock is open. Alternatively, the control element may be open when the air lock is open.

By means of the control element 10, the pressure in the compressed-air chamber 10 can be set and limited to a user-selectable maximum value, preferably 2 kPa (=2 bars).

The laser measuring device 1 and the motor M for the air lock 6, 6' are controlled by an electronic controller 11 in such a way that the operation of the motor is synchronized with the beginning of a measurement.

A measurement is performed as follows. First, with the air lock 6' closed, an air pressure preferably not exceeding 2 kPa (=2 bars) is created in the compressed-air chamber 3. Then, the air lock 6' is briefly opened for the measurement, preferably under electronic control and synchronously with the transmission of a laser pulse 2, thus unblocking the light channel 7 until the light beams reflected from the test object 8 have been received by the detector in the measuring device 1. After that, the air lock 6 is closed again, preferably also under electronic control.

The overpressure in the compressed-air chamber 3 and the air escaping through the light channel 7 when the air lock 6' is opened prevent dust or dirt particles from entering the compressed-air chamber 3 through the light channel 7 and depositing on the protective pane or lens in the window of the measuring device 1.

This effect will be enhanced if air is blown through the compressed-air connection 4 into the compressed-air chamber 3 also during the measuring operation, i.e., when the air lock 6 is open. When the air-lock 6 is closed again on completion of the measuring operation, the overpressure of preferably 2 kPa can build up in the compressed-air chamber 3 in a short time, and the device is then ready for the next measurement.

Since the air lock 6, 6' is opened only for the measurement and otherwise remains closed, the consumption of compressed air is very low, so that the compressed air can be made available by a small pump in situ during the intervals between measurements; expensive compressed-air lines are not necessary. The pump need not run continuously at full power, which would be necessary if the cleaning were done using a jet of compressed air permanently passing over the protective pane or lens of the measuring device.

While the invention has been illustrated and described in detail in the drawing and foregoing description, such illustration and description is to be considered as exemplary and not restrictive in character, it being understood that only exemplary embodiments have been shown and described and that all changes and modifications that come within the spirit of the invention are desired to be protected.

What is claimed is:

1. A measuring apparatus using laser beams and using compressed air from a source of compressed air, the apparatus comprising:

a chamber being configured to receive the compressed air; and an air lock coupled to the chamber, the air lock being movable between an opened position during a measurement whereby the laser beams are permitted to pass through the air lock and a closed position whereby the laser beams are inhibited from passing through the air lock.

2. A measuring apparatus as claimed in claim 1, further comprising:

a compressed-air line coupling the source of compressed air to the chamber; and a control element in the compressed-air line, which blocks a passage of the compressed air when the air lock is in the opened position.

3. A measuring apparatus as claimed in claim 2 wherein the control element permits a passage of the compressed air when the air lock is in the opened position.

4. A measuring apparatus as claimed in claim 2 wherein the control element limits the pressure in the chamber to a maximum of 200 kPa.

5. A measuring apparatus as claimed in claim 1, further comprising:

a motor coupled to the air lock, wherein the motor actuates the air lock, and wherein the actuation is synchronized with the beginning of a measurement.

6. A measuring apparatus as claimed in claim 5 wherein the motor is at least one of electrically and pneumatically driven.

7. A measuring apparatus as claimed in claim 1, further comprising:

an oil filter in the compressed-air line between the chamber and the source of compressed air.

8. A measuring apparatus as claimed in claim 3 wherein the control element limits the pressure in the chamber to a maximum of 200 kPa.

9. A measuring apparatus as claimed in claim 2, further comprising:

a motor coupled to the air lock, wherein the motor actuates the air lock, and wherein the actuation is synchronized with the beginning of a measurement.

10. A measuring apparatus as claimed in claim 3, further comprising:

a motor coupled to the air lock, wherein the motor actuates the air lock, and wherein the actuation is synchronized with the beginning of a measurement.

11. A measuring apparatus as claimed in claim 4, further comprising:

a motor coupled to the air lock, wherein the motor actuates the air lock, and wherein the actuation is synchronized with the beginning of a measurement.

12. A measuring apparatus as claimed in claim 2, further comprising:

an oil filter in the compressed-air line between the chamber and the source of compressed air.

13. A measuring apparatus as claimed in claim 3, further comprising:

an oil filter in the compressed-air line between the chamber and the source of compressed air.

14. A measuring apparatus as claimed in claim 4, further comprising:

an oil filter in the compressed-air line between the chamber and the source of compressed air.

15. A measuring apparatus as claimed in claim 5, further comprising:

an oil filter in the compressed-air line between the chamber and the source of compressed air.

16. A measuring apparatus as claimed in claim 6, further comprising:

an oil filter in the compressed-air line between the chamber and the source of compressed air.

* * * * *